United States Patent
Sastry

(10) Patent No.: US 8,412,743 B2
(45) Date of Patent: *Apr. 2, 2013

(54) NESTED CATEGORIZATION USING FACTORIZATION

(75) Inventor: Nishanth Sastry, Concord, MA (US)

(73) Assignee: SAP AG, Walldorf (DE)

( * ) Notice: Subject to any disclaimer, the term of this patent is extended or adjusted under 35 U.S.C. 154(b) by 495 days.

This patent is subject to a terminal disclaimer.

(21) Appl. No.: 12/354,440

(22) Filed: Jan. 15, 2009

(65) Prior Publication Data

US 2009/0125493 A1     May 14, 2009

Related U.S. Application Data

(63) Continuation of application No. 11/281,313, filed on Nov. 17, 2005, now Pat. No. 7,487,143.

(51) Int. Cl.
*G06F 7/00* (2006.01)
*G06F 17/30* (2006.01)

(52) U.S. Cl. .................. 707/798; 707/956
(58) Field of Classification Search .......... 707/738, 707/793, 922, 956, 796–798
See application file for complete search history.

(56) References Cited

U.S. PATENT DOCUMENTS

| | | | | |
|---|---|---|---|---|
| 4,811,237 A | * | 3/1989 | Putatunda et al. | 716/127 |
| 5,253,331 A | * | 10/1993 | Lorenzen et al. | 706/45 |
| 5,493,678 A | * | 2/1996 | Arcuri et al. | 1/1 |
| 5,832,520 A | * | 11/1998 | Miller | 1/1 |
| 6,105,033 A | * | 8/2000 | Levine | 1/1 |
| 2002/0129135 A1 | * | 9/2002 | Delany et al. | 709/223 |
| 2002/0186837 A1 | * | 12/2002 | Hopkins et al. | 380/28 |
| 2002/0194177 A1 | * | 12/2002 | Sherman et al. | 707/8 |
| 2005/0144245 A1 | * | 6/2005 | Lowe | 709/206 |
| 2006/0176306 A1 | * | 8/2006 | Nagaraj et al. | 345/440 |

OTHER PUBLICATIONS

Wu et al. "A Prime Number Labeling Scheme for Dynamic Ordered XML Trees", Proceedings of the 20th International Conference on Data Engineering, Apr. 2004, 13 pages.*
Joyce, David E., 'Euclid's Elements, Book VII', Clark University, Archived at archive.org on Jun. 4, 2004, [retrieved on May 7, 2011], Retrieved from the Internet < URL:http://replay.web.archive.org/20040604170139/http://aleph0.clarku.edu/~djoyce/java/elements/bookVII/propVII24.html>, 3 pages.*
Weisstein, "CRC Concise Encyclopedia of Mathematics", CRC Press LLC, 1999, pp. 1432-1435 and 1543.*

* cited by examiner

*Primary Examiner* — James E Richardson
(74) *Attorney, Agent, or Firm* — Sterne, Kessler, Goldstein & Fox PLLC

(57) ABSTRACT

A system for information item categorization in which each non-leaf node in a hierarchical organization of nodes represents a category, and each leaf node represents an information item. A number P is associated with each node. For non-leaf nodes, the associated number P is selected from a subset of relatively prime elements chosen from an appropriate Unique Factorization Domain (UFD), such as a set of relatively prime numbers which are a subset of the familiar set of integers. For leaf nodes, P is set to 1. A number M is also associated with each node. For each root node, M is set to the value of P for that node. For each non-root node, M is set to the product of the M's of all parent nodes of the node and the P of that node.

14 Claims, 6 Drawing Sheets

NESTED CATEGORIZATION USING FACTORIZATION

CROSS-REFERENCE TO RELATED APPLICATIONS

The present application is a Continuation under 35 U.S.C. 120 of commonly assigned prior U.S. application Ser. No. 11/281,313, filed Nov. 17, 2005 now U.S. Pat. No. 7,487,143 in the name of Nishanth Sastry, now allowed.

FIELD OF THE INVENTION

The present invention relates generally to software systems for storage and retrieval of information, and more specifically to a system and computer program product for nested categorization using factorization.

BACKGROUND OF THE INVENTION

As it is generally known, many situations call for computer software to organize information into categories. For example, FIG. 1 shows a simplified screen shot 10 illustrating a software generated user interface, provided through a Web Browser application, enabling a user to browse a set of project information objects. In the example of FIG. 1, the user has indicated to the system that he or she desires to browse the project categories within the Database API (Application Programming Interface) category, which is contained within the higher level category of Database Environment. In the example categorization of FIG. 1, a project can be classified by database environment, intended audience, operating system, programming language, translations, or user interface. FIG. 1 illustrates that categories may be nested in such systems, as in the nesting of the Database API category within the Database Environment category, and the various sub-categories within Database API.

Many other, different views of project categorization may be generated using a system such as that shown in FIG. 1. For example, a user may want to filter one or more categories to which a project might belong, e.g. view all projects that use JDBC or XML-based database APIs, and that are written in Java (Programming Language category). Those skilled in the art will recognize that many other examples of information categorization exist on the World Wide Web (WWW) and elsewhere. These examples include various employment databases, which may allow for filtering of available jobs by employer and location, online shopping Web sites, which may allow for filtering by product, brand, and/or product features, electronic mail (e-mail) systems, which may allow categorization of a single piece of e-mail into several different folders, and others.

As further illustrated by FIG. 1, a useful metaphor for existing software categorizers has been to view each category as a folder. In such systems, each folder in a hierarchy of folders can itself contain sub-folders representing sub-categories. A folder at any level can contain information items, such as projects, e-mail messages, shopping items, etc. Additionally, any information item can appear in more than one folder, and any folder can be a sub-folder under any number of other folders. However, a folder cannot be a sub-folder of another folder that is its ancestor, i.e. cycles are not permitted.

One technical challenge in implementing information item categorizations is the nested nature of the categories. For example, a categorizer for a job database should be equally able to find all jobs within a coarser category, such as those located in Massachusetts, as it is to find all jobs within a sub-category, such as all jobs located in Westford, Mass.

In more general terms, the problem to be solved involves categories forming a directed acyclic graph, with the leaf nodes being the items to be retrieved, and the non-leaf nodes representing the categories. The graph includes an edge from node a to node b if either i) node b is a sub-category of node a or ii) node b is a leaf item under category a. For any query, the system must be able to retrieve all leaf nodes reachable from a given collection of non-leaf nodes.

Using the above formulation, a straightforward implementation would be to calculate a reachability matrix as the transitive closure of the adjacency matrix of the graph. For example, such a reachability matrix may have a 1 for entry [i,j] if there is at least one path from node i to node j, and zero otherwise. Such an approach may be sufficient for fairly static applications, such as online shopping, in which the items or their classifications do not change frequently. However, for more dynamic applications, in which items are re-categorized more frequently, as in a categorization of a user's e-mail messages, this approach does not work as well, since the transitive closure calculation is expensive in terms of resources used.

An alternative approach using relational databases might store links to actual items as direct descendents of non-leaf nodes. For example, in a database corresponding to the interface shown in FIG. 1, the following records could be stored (for clarity only leaf-item containments are listed): (projectid-n, database-environment), (projectid-n, database-api), (projectid-n, JDBC). Thus the reachability matrix is stored as relational records, and the system copies only the identifier to avoid duplication of other information. Handling of leaf-node changes using such an approach is relatively easy, but non-leaf nodes are more difficult to change. For example, if the JDBC category got re-parented under a different super-category, the system would have to remove the records (projectid-n, database-environment), (projectid-n, database-api). Also, as the number of filters specified increases, the query to the categorization system gets more and more complex (more joins), and performance suffers as a result.

In the specific area of e-mail message categorization, Google's Gmail™ offers another, alternative approach. In the Gmail system, each piece of e-mail can have one or more "labels" attached to it, thus allowing the same mail item to appear in multiple views. However, a significant shortcoming of the system is that labels cannot be nested. Given that limitation, operations discussed above are relatively simple and efficient in this model.

For the above reasons and others it would be desirable to have a new system for information item categorization that allows for nested categorizations and optionally allows a single category or item to be contained in multiple parent categories, that can handle dynamic categorization changes, and that is simpler and more efficient than previous solutions. The new system should be generally applicable to a variety of applications, and specifically applicable to categorization of e-mail messages.

SUMMARY OF THE INVENTION

In order to address the above described and other shortcomings of previous solutions, a system and computer program product for information item categorization are disclosed. In the disclosed system, each non-leaf node in a hierarchical organization of nodes represents a category, and each leaf node represents an information item. A number P is associated with each node. For non-leaf nodes, the associated number P is selected from a set of relatively prime elements of an appropriate Unique Factorization Domain (UFD). For leaf nodes, P is set to 1. A number M is also associated with each node. For each root node, M is set to the value of P for that node. For each non-root node, M is set to the product of the M's of all parent nodes of the node and the P of that node. For example, the calculation of M may be accomplished in a recursive manner. As a result, the value of M for any node contains as factors the Ps of all its ancestor nodes in the tree or acyclic graph making up the node hierarchy.

Queries to find items located under a given node N are accomplished in the disclosed system by identifying those leaf nodes having an associated value M that is completely divisible by the value of P associated with N. Accordingly, pseudo-SQL to find all items under a node N at any level is: SELECT * from LEAF_ITEMS_TBL L where N.P completely divides L.M The disclosed system operates to re-parent a node N from parent node P1 to parent node P2 by simply removing the factors of its old parents (by dividing them out), and adding the factors of the new parent (by multiplying with the new factor). This is accomplished by multiplying node N and all its childrens' M's with the following difference factor:

$$D=(P2 \cdot M)/(P1 \cdot M)$$

Thus there is disclosed a new system for information item categorization that allows for nested categorizations, that can handle dynamic categorization changes, and that is simpler and more efficient than previous solutions. The new system is generally applicable to a variety of applications, and specifically applicable to categorization of e-mail messages.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 2:
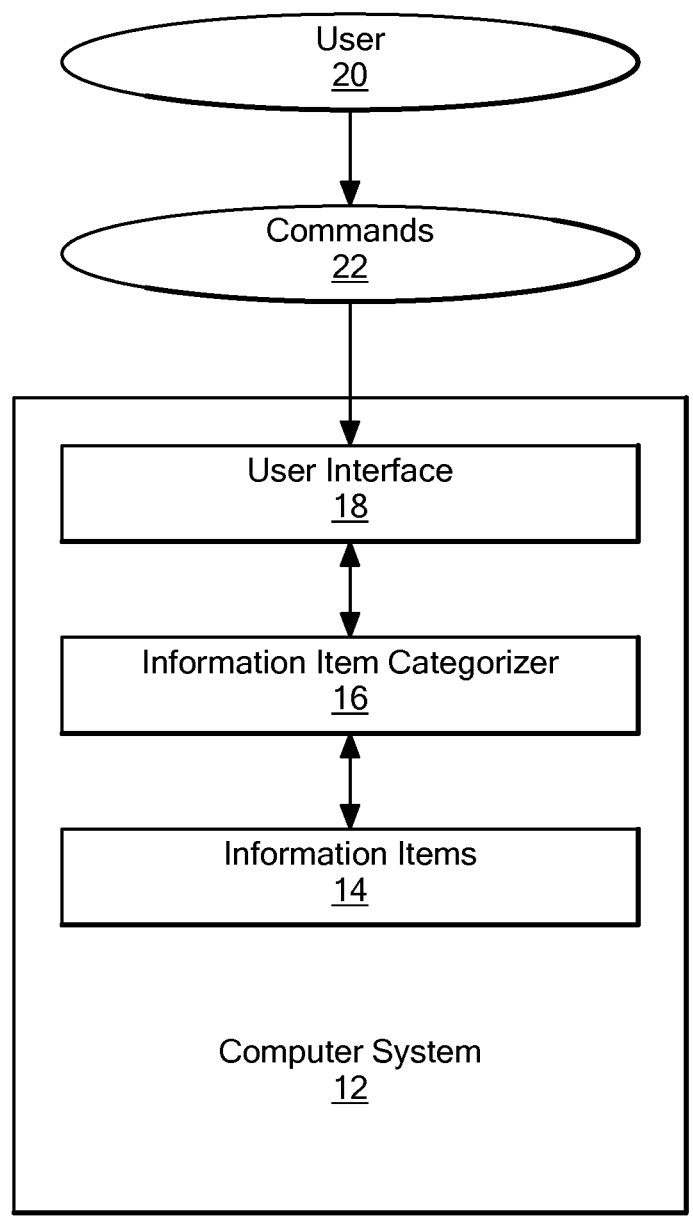
FIG. 2 is a block diagram showing the structure and operation of software components in an illustrative embodiment of the disclosed system.

As shown in FIG. 2, an illustrative embodiment of the disclosed system operates using a number of software components executing on at least one computer system, shown for purposes of illustration as the computer system 12. The computer system 12 may, for example, include at least one processor, program storage, such as memory, for storing program code executable on the processor, and one or more input/output devices and/or interfaces, such as data communication and/or peripheral devices and/or interfaces. The computer system 12 may further be embodied as one or more physically distributed computer systems, such as one or more client and server computer systems, that are communicably connected by a data communication system, such as a Local Area Network (LAN), the Internet, or the like. The computer system 12 may further include appropriate operating system software.

In the embodiment of FIG. 2, a user 20 issues commands 22 through a graphical user interface 18. The user interface 18 may, for example, be generated using application software such as a browser application program or the like operating to provide views of content including one or more Web pages, an electronic mail (e-mail) application program, or any other specific computer program executing on the computer system 12. The commands 22 received through the user interface 18 are processed, at least in part, using the information item categorizer software 16, which operates to organize the information items 14 into a hierarchical set of categories. The categories provided through the information item categorizer 16, together with the information items 14, are organized as a hierarchical structure of nodes, wherein each information item is represented by a leaf node and each category is represented by a non-leaf node in the structure. The node structure provided by the information item categorizer 16 may form, for example, a tree of nodes, a directed acyclic graph of nodes, or some other specific type of structure including leaf and non-leaf nodes, but that includes no cycles.

The commands 22 may include user requests for information items contained in, or located under one or more categories. The commands 22 may further include requests to move information items and/or categories within the node structure. Such operations are referred to herein for purposes of explanation as "re-parenting" of nodes. The results of the commands 22 may be provided through the user interface 18, which may visually display information items and/or categories as folder display objects, or in any other appropriate manner for a particular embodiment. The information items 14 may consist of or represent any specific kind of information that can be stored in a computer system, such as content, data, program code, etc.

Figure 1:
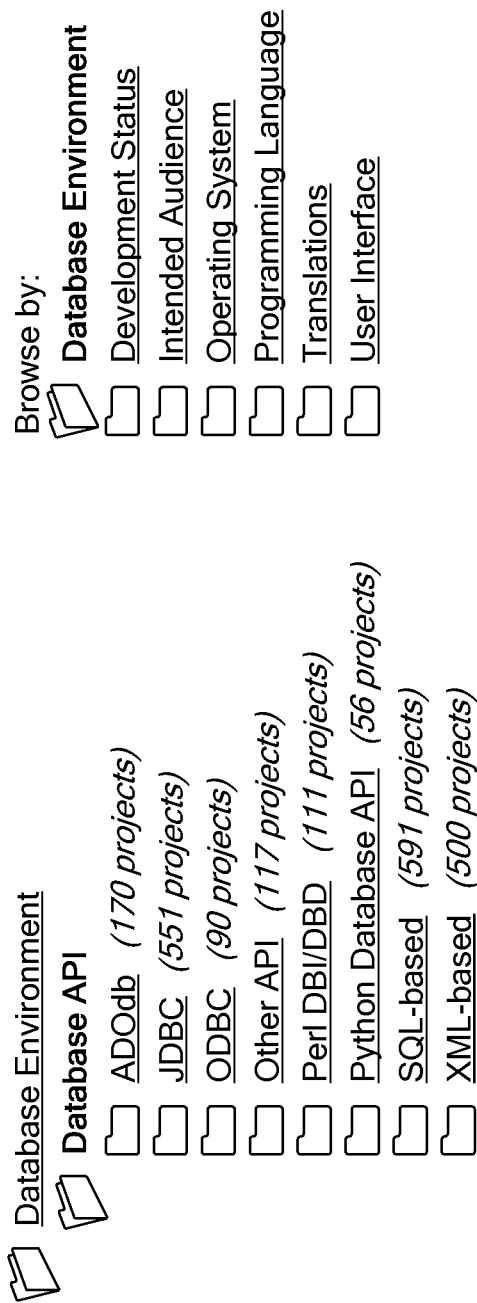
FIG. 1 is a simplified screen shot illustrating software, provided through a Web Browser application, enabling a user to browse a set of projects.
Figure 3:
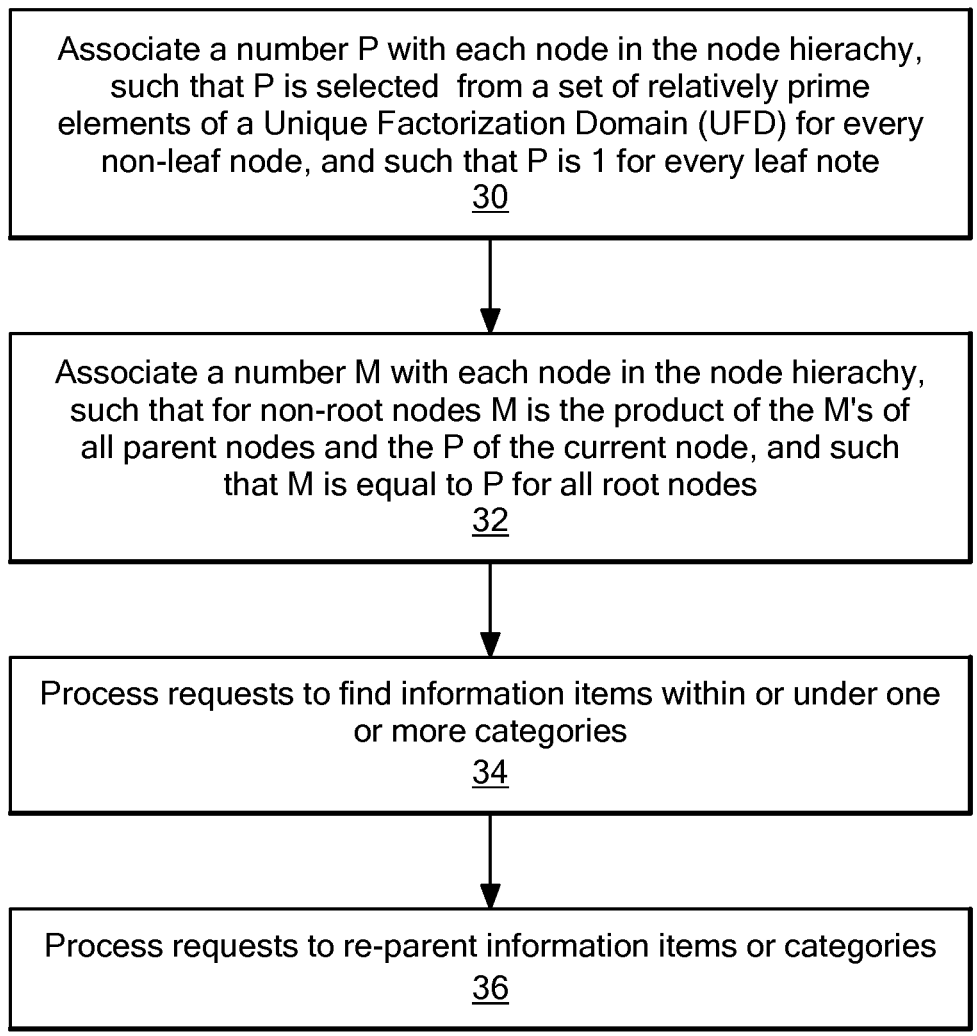
FIG. 3 is a flow chart showing steps performed in an illustrative embodiment.

FIG. 3 is a flow chart illustrating steps performed in an embodiment of the disclosed system. At step 30, the disclosed system associates a number P with each node in the node hierarchy maintained by the information categorizer 16 of FIG. 1. The number P is uniquely selected from a set of relatively prime elements of an appropriate Unique Factorization Domain (UFD) for every non-leaf node, and P is set to 1 (the multiplicative identity element in the UFD) for every leaf node. UFDs are used here in the sense commonly defined in Ring Theory in abstract algebra: as integral domains in which every non-zero non-invertible element has a unique factorization, i.e., an essentially unique decomposition as the product of prime elements or irreducible elements. Equivalently, a UFD may be defined as an integral domain R in which every non-zero non-unit can be written as a product of prime elements of R. The most common example of a UFD is the ring of Integers, in which the prime numbers are the irreducible elements. Gaussian integers are another example UFD which can be used in an embodiment of the invention.

For further example, the number P may be selected for each node at step 30 from a set of prime numbers. Alternatively, the number P can be selected for each node from any set containing only numbers which are relatively prime to each other. The numbers in such a set of relative primes should meet the condition that the greatest common divisor of any pair within the set is 1. For example the set {32, 65 and 9} are not primes, but are relatively prime to each other.

In another alternative embodiment, P may be selected from a set of probable prime numbers, and then verified to be relatively prime to previously selected numbers. For example, one definition of a probable prime number in such an embodiment might be a number satisfying Fermat's little theorem (or some other primality test) for some nontrivial base. Any appropriate technique may used to verify the relative primality of P with regard to the previously selected numbers. This approach eliminates the need for generating or managing actual prime numbers. Probable primes are often much easier to generate than actual primes, and the probability that two of them will have a common factor is almost negligible. For example, the standard Java library class java.math.BigInteger includes a fast method to calculate probable primes with a probability of less than $2^{(-100)}$ that they are not prime.

At step 32, the disclosed system operates to associate a number M with each node in the node hierarchy, such that for non-root nodes, M is the product of the M's of all parent nodes and the P of the current node, and such that M is equal to P for all root nodes.

After step 32, requests to find information items directly under or under one or more categories can be processed at step 34. As noted above, a query to find items located under a given category is processed in the disclosed system by identifying those information items represented by leaf nodes having an associated value M that is completely divisible by the value of P associated with the node N representing the given category. Accordingly, and as noted above, pseudo-SQL to find all items under a node N at any level is:

SELECT * from LEAF_ITEMS_TBL L where N.P completely divides L.M

For example, in the case where P is selected for each non-leaf node from a set of prime numbers, the select statement above will retrieve only the information items within the category being searched because N.P is a prime number or the like, and the only way a leaf node L can have a value L.M that has N.P as a factor is if L is a descendent reachable from N. Thus non-descendent items are not retrieved because the selected values for P are sufficiently guaranteed to not divide each other. Other examples of operation with regard to retrieving information items using embodiments of the disclosed system are also provided below.

At step 36, the disclosed system operates to re-parent nodes representing information items and/or categories, as also further described below.

Figure 4:
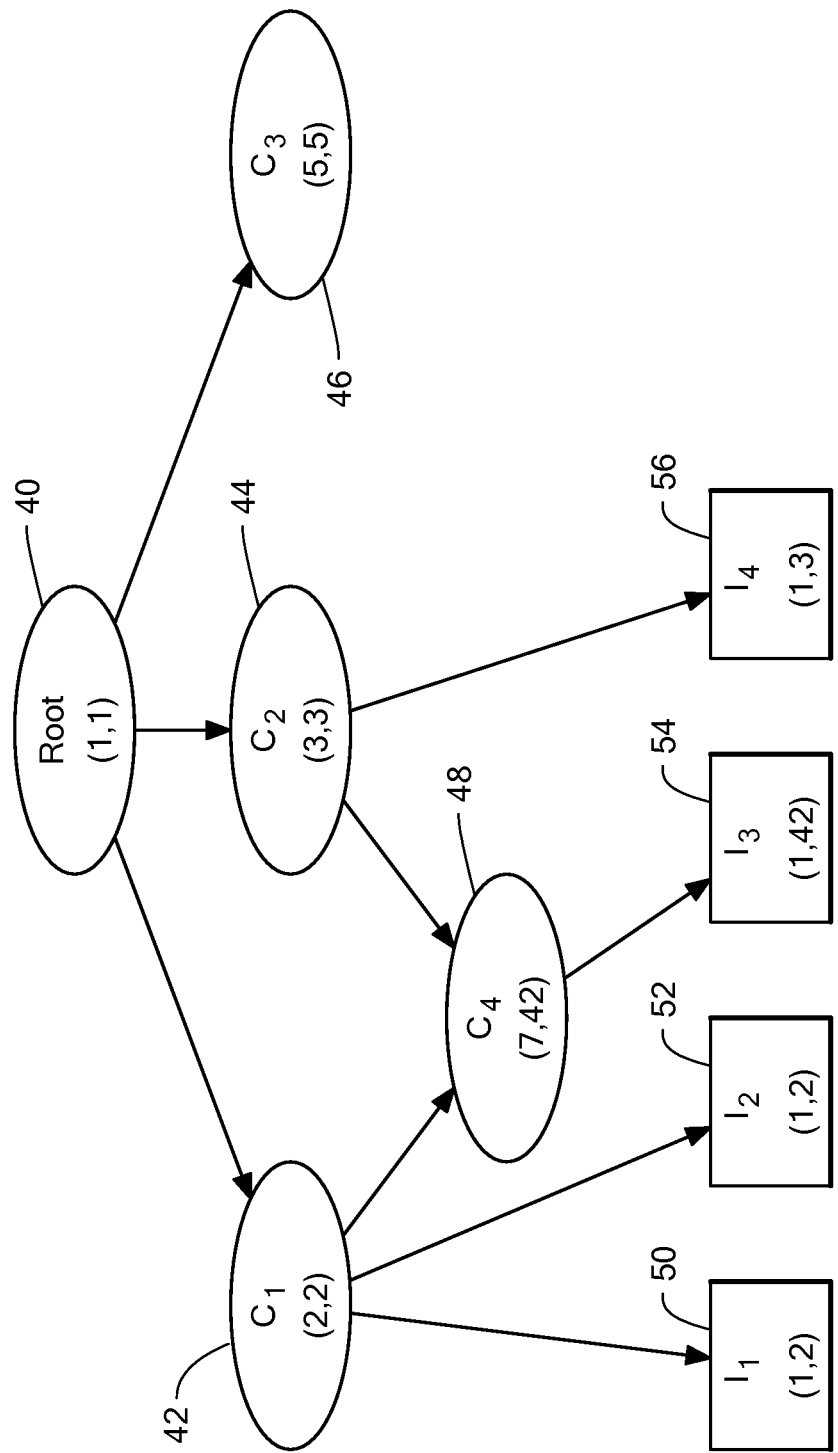
FIG. 4 is a first graphical representation of a hierarchical structure of nodes in an illustrative embodiment.

FIG. 4 is an example of a node hierarchy in an illustrative embodiment. As shown in FIG. 4, a node hierarchy includes a root node 40, and a number of category nodes $C_1$ 42, $C_2$ 44, $C_3$ 46, and $C_4$ 48. The node hierarchy of FIG. 4 further includes information item nodes $I_1$ 50, $I_2$ 52, $I_3$ 54 and $I_4$ 56. Each node is shown with its P and M values in parenthesis, such that the root node 40 has P=1 and M=1, $C_1$ has P=2 and M=2, $C_2$ has P=3 and M=3, $C_3$ has P=5 and M=5, $C_4$ has P=7 and M=42, $I_1$ has P=1 and M=2, $I_2$ has P=1 and M=2, $I_3$ has P=1 and M=42 and $I_4$ has P=1 and M=3.

For example, in order to find all information items contained within category $C_1$ alone, the disclosed system operates to identify information item nodes having values of M equal to the M value of $C_1$, which in this case is 2. Accordingly, the disclosed system determines that information item nodes $I_1$ and $I_2$ are contained in category $C_1$, since they both have M values of 2. In order to find all information items under category $C_2$ (either within $C_2$ or within a category below $C_2$ in the node hierarchy), the disclosed system operates to identify information item nodes having values of M that are divisible by the value P value of $C_2$, which in this case is 3. Accordingly, the disclosed system determines that information item nodes $I_3$ and $I_4$ have values of M that are completely divisible by 3 (42 and 3 respectively), and those information item nodes are therefore under category node $C_2$.

In order to find all information item nodes under both category node $C_1$ and category node $C_2$, the disclosed system operates to find all information item nodes having values of M that are divisible by the product of the P values for nodes $C_1$ and $C_2$, in this case 2*3=6. Accordingly, the disclosed system determines that information item node $I_3$ has an M value of 42 that is divisible by 6, and is therefore under both category node $C_1$ and category node $C_2$. In this way the disclosed system can determine which information items are under multiple specified categories.

In order to find all information item nodes directly under both category $C_1$ and $C_2$, the disclosed system operates to find all information item nodes having values of M that are equal to product of the P value for node $C_1$ and the P value for $C_2$, in this case 2*3=6. Accordingly, the disclosed system determines that no information item nodes have M equal to 6, and therefore no information item nodes are contained within both $C_1$ and $C_2$.

While the aspect of the disclosed system described in the preceding paragraph processes queries looking for nodes directly under node $C_1$ and directly under node $C_2$ and having no other parent nodes, the disclosed system is not limited to processing such types of queries. Those skilled in the art will recognize that the disclosed system is capable of processing queries for nodes having at least nodes $C_1$ and $C_2$ as parents through use of a separate table with (node-id, parent-node-id) as columns. Such a table can be searched quickly for all node-ids with $C_1$ in the parent-node-id column and then this result set can be filtered again for nodes with $C_2$ as parent-node-id.

In order to process a request that category node $C_4$ be moved under category $C_3$, the disclosed system operates to determine a first value by multiplying the M value of $C_4$ by the M value of $C_3$, in this case 42*5=210. Then a second value is determined that is the product of M for $C_1$ and M for $C_2$, in this case 2*3=6. Then the first value is divided by the second value to determine a new value for M of $C_4$, in this case 210/6=35. This process is then repeated each sub-tree of $C_4$.

The above example illustrates how the disclosed system operates to re-parent a node N from parent node P1 to parent node P2 by removing the factors of its old parents (by dividing them out), and adding the factors of the new parent (by multiplying with the new factor). As illustrated above with reference to FIG. 4, this may be accomplished by multiplying node N and all its children's' M's with the following difference factor:

$$D=(P2 \cdot M)/(P1 \cdot M)$$

As noted above, the disclosed system is able to process complex queries with multiple categories specified as filters, by replacing the value of P in the previously set forth SELECT statement pseudo-code with the product of the Ps of all the category nodes specified. This aspect of the disclosed system is now further explained with reference to an example of a hypothetical categorization of messages within a person's Inbox structure, provided in an e-mail application program or the like, and shown in the node hierarchy of FIG. 5. As in FIG. 4, the value pairs in parenthesis shown within the nodes of FIG. 5 denote the P and M values of the nodes containing them. Accordingly, node 60 representing a category of e-mail messages received from a manager has P=2 and M=2, node 62 representing a category of human resources e-mail messages has P=3 and M=3, node 64 representing a category of e-mail messages from the manager and listing the person in a To: field has P=7 and M=14, node 66 representing a category of e-mail messages received from the manager and listing the person in the CC: field has P=11 and M=22, node 68 representing a category of e-mail messages relating to company policy has P=5 and M=15, node 70 representing a category of e-mail messages that are pay statements has P=13 and M=39, node 74 representing a category of e-mail messages relating to security policy has P=17 and M=255, node 63 representing a category of e-mail messages relating to corporate matters has P=23 and M=23, and an example message 72 is contained both within the category for node 64 and the category for node 74.

Figure 5:
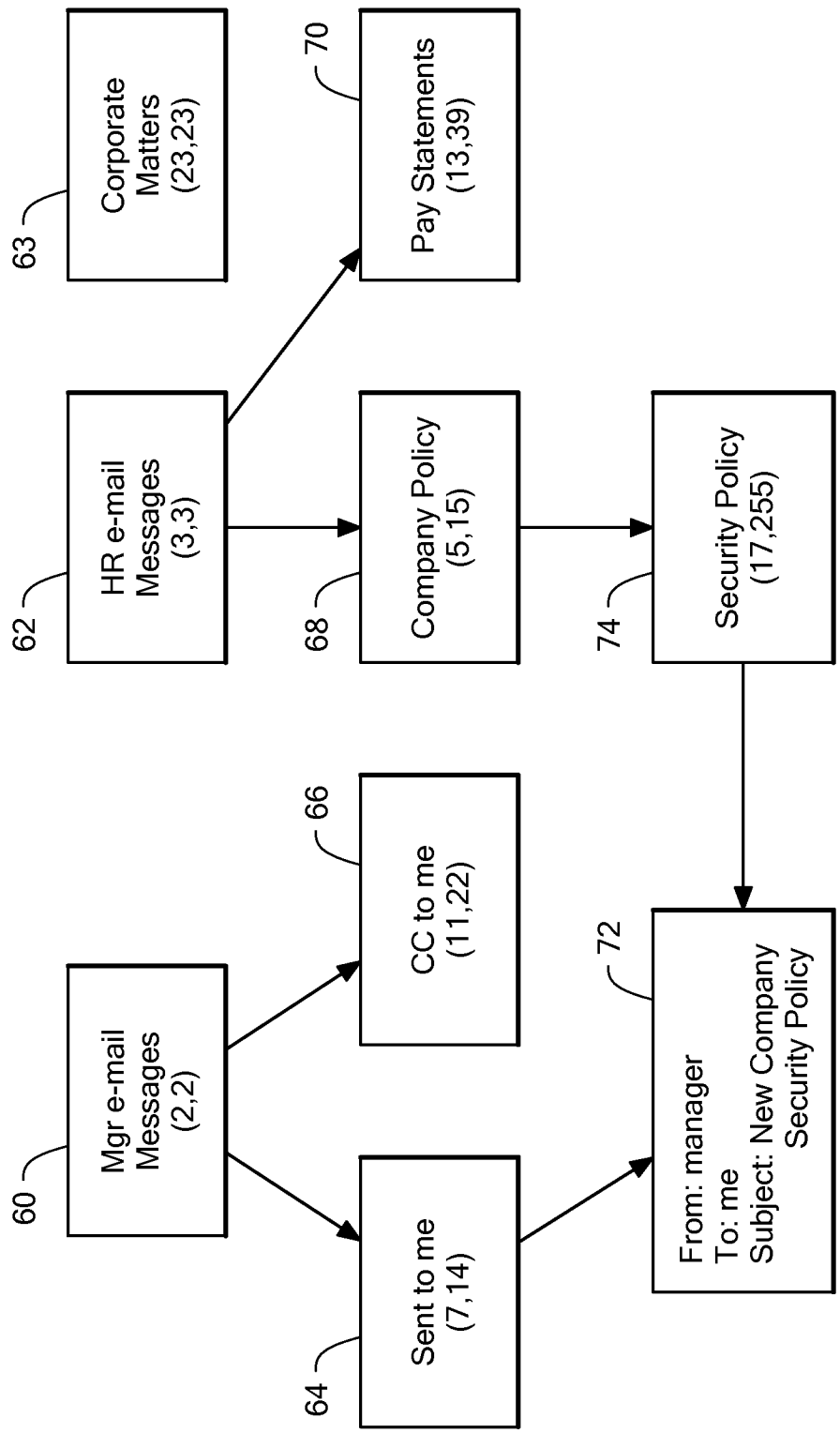
FIG. 5 is a second graphical representation of a hierarchical structure of nodes in another illustrative embodiment.

Thus the message 72 is a leaf-node of the node hierarchy shown in FIG. 5, and is classified under the category of e-mails from the manager and having the person listed in the To: field category (node 64), and also under the company security policy category (node 74). In accordance with an embodiment of the present invention, the message 72 would therefore have a value for M equal to the product of the M of node 64 times the M of node 74: 14*255=3570. The e-mail message 72 would accordingly be provided in and/or displayed as part of the result set when the disclosed system is used to filter on e-mails from the manager (node 60), because 3570 is divisible by 2, or when the disclosed system is used to filter on human resources e-mails (node 62), because 3570 is divisible by 3, or when the disclosed system is used to filter on company policy e-mails (node 68), because 3570 is divisible by 5, etc.

A complex filter could be used to search for all e-mails from the manager (node 60) and that are also categorized under company policy (node 68). In such a case, the product of the Ps of the two nodes 60 and 68 would be used as the divisor. Such an operation may be represented by the pseudo-code select statement referred to above and modified to look like the following:

SELECT * from LEAF_ITEMS_TBL L where 5*2 completely divides L.C

Those skilled in the art will recognize that unlike the traditional relational representation, adding more and more categories to filter by advantageously does not degrade performance by making the join operations more complex.

An example of re-parenting a node within the node hierarchy of FIG. 5 is now provided. The disclosed system first receives a command from the user requesting that security policy e-mails (node 74) be moved under corporate matters (node 63). The disclosed system operates to process this request by multiplying the M's of the security policy node (node 74), and of each node under the security policy node (node 72 in this case) by a difference factor value of 23/15. As a result, the security policy node (node 74) would have (P,M)= (17,391) and the e-mail message 72 which previously had M=3570 would now have M=5474.

If the user were to issue a command requesting that the corporate matters node (node 63) be added as a new parent to a node, without removing any old parent nodes, the disclosed system would process the request by multiplying the M value of the node to which the new parent node is being added by the M value of that node (23 in this case), without dividing by the M value of the existing parent (15 in the previous example). To process a user request to remove a parent node, the disclosed system operates to divide out the M value of the parent node being removed from the M value of the child node (and all nodes in all the sub-trees rooted at the child-node) from which the parent is being removed. For example, to remove security policy node (node 74) as a parent from the e-mail message 72, the disclosed system would divide out the M value of node 74 (255) from the M value of the e-mail message 72.

It may be desirable to prevent removal of a higher level categorization of a given node without removing descendant sub-categories of that higher level categorizations for that same node. For example, removing the company policy node (node 68) as a parent node of the message 72 could be accomplished by dividing the M of message 72 by the M of node 68 (15). However, this would only remove the message 72 from the company policy category (node 68), but still leave the message 72 under the company policy/security policy sub category (node 74). To prevent such an event, the disclosed system may be embodied to allow only a direct parent node to be removed, and to accordingly prohibit removal of non-direct ancestors of any node. Similarly, it may be desirable to prevent adding a descendant node of a given node as a new parent of that given node. This can be accomplished by checking that a new parent node is not contained in a category represented by the given node to which it is to be added, for example using the techniques described herein.

Figure 6:
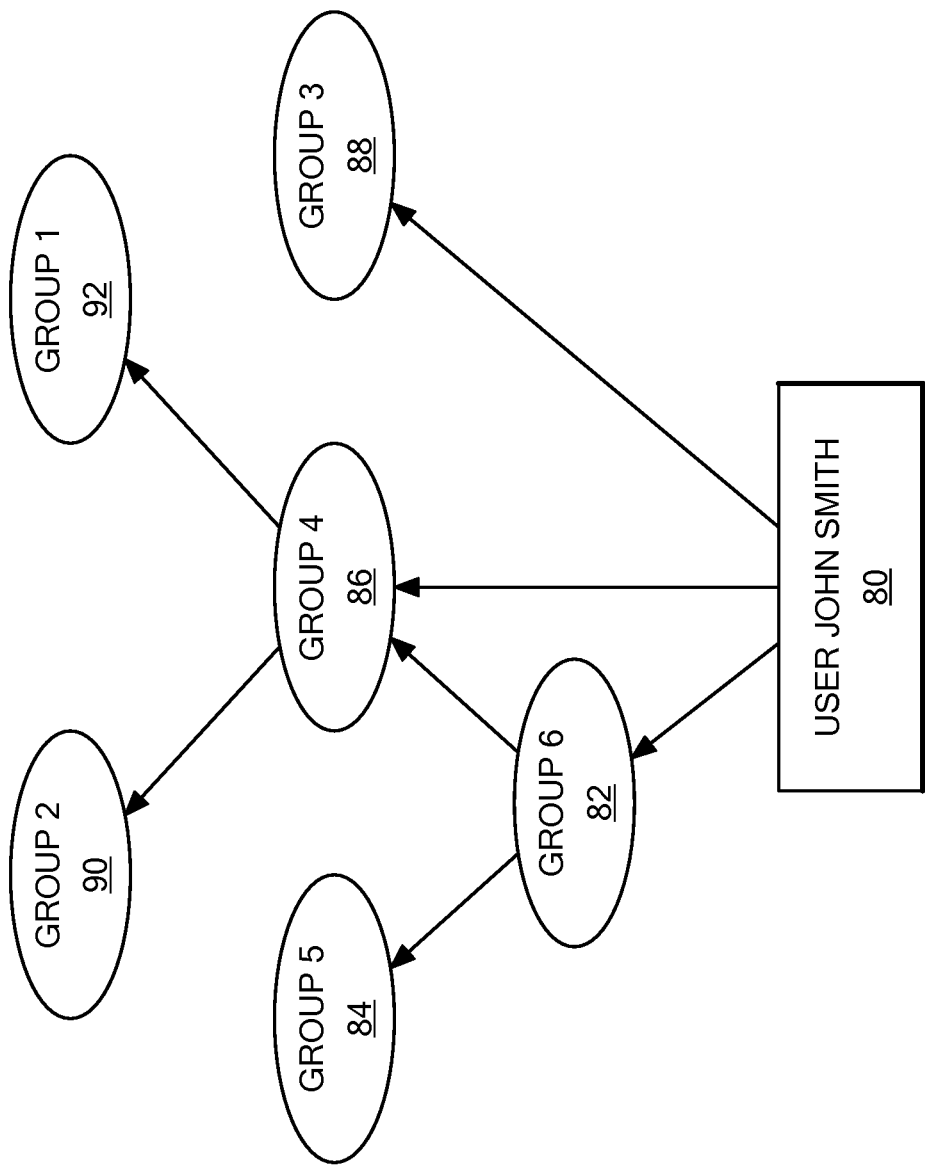
FIG. 6 is a third graphical representation of a hierarchical structure of nodes in another illustrative embodiment

FIG. 6 shows another illustrative embodiment of the disclosed system, in which the hierarchical node structure represents the nested group membership for a user. In the example of FIG. 6, a user John Smith represented by the leaf node 80. The user John Smith is a member of Group 6 represented by node 82, Group 4 represented by node 86, and Group 3 represented by node 88. The hierarchical node structure of FIG. 6 also shows that Group 6 is a sub-group of Group 5 (node 84) and Group 4 (node 86), and that Group 4 is a sub-group of Group 2 (node 90) and Group 1 (node 92). As in the example of FIG. 6, group membership node hierarchies often form wide, shallow trees. A group membership node hierarchy such as that shown in FIG. 6 may be used to manage resource access control on groups, rather than on individual users. Advantageously, when John Smith drops his membership from Group 6 (node 82), the system need only remove the parent node 82 from the leaf-node 80. This will automatically remove membership from Group 5 (node 84). John Smith still retains membership in Group 4 (node 86), Group 3 (node 88), Group 2 (node 90) and Group 1 (node 92) because he is directly a member of Group 4 (node 86) and Group 3 (node 88).

The Figures include block diagram and flowchart illustrations of methods, apparatus(s) and computer program products according to an embodiment of the invention. It will be understood that each block of the Figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

I claim:

1. A method for categorizing information items using a hierarchical structure of nodes, wherein each information item is represented by a leaf node and each category is represented by a non-leaf node in said hierarchical structure, comprising:
   associating a first number with each node, wherein for each non-leaf node said first number is uniquely selected from a subset of relatively prime elements within a unique factorization domain, wherein said subset of relatively prime elements includes at least one nonprime element, wherein elements of said subset of relatively prime elements taken pairwise are all relatively prime to each other, and wherein for each leaf node said first number is equal to one; and
   associating a second number with each node, wherein for each root node said second number is equal to said first number, wherein for each non-root node said second number is equal to a product of said second numbers associated with each direct parent node of said non-root node and said first number of said non-root node, and wherein at least one non-root node has multiple direct parents, said second number for said at least one non-root node being equal to a product determined from multiplying said second numbers belonging to each of said multiple direct parents and said first number of said at least one non-root node.

2. The method of claim 1, further comprising:
processing a query to find information items located under a given node by identifying those leaf nodes having an associated second number completely divisible by a first number associated with said given node.

3. The method of claim 1, further comprising:
processing a query to find information items located under a given node by identifying those leaf nodes having an associated second number completely divisible by a second number associated with the given node.

4. The method of claim 1, further comprising:
processing a query to find information items located under a plurality of nodes by identifying those leaf nodes having an associated second number completely divisible by a product of said first numbers associated with respective ones of said plurality of nodes.

5. The method of claim 1, further comprising:
processing a query to find information items located under a plurality of nodes by identifying those leaf nodes having an associated second number completely divisible by a product of said second numbers associated with respective ones of said plurality of nodes.

6. The method of claim 1, further comprising:
processing a query to find information items that are direct children of a plurality of nodes by identifying those leaf nodes having an associated second number equal to a product of said second numbers associated with respective ones of said plurality of nodes.

7. The method of claim 1, wherein said unique factorization domain comprises the set of non-negative integers and said first numbers are chosen from the set of probable prime numbers determined as numbers satisfying a predetermined primality test.

8. The method of claim 7, wherein said predetermined primality test comprises Fermat's little theorem.

9. The method of claim 1, wherein said hierarchical structure of nodes represents a categorization of electronic mail messages within a mailbox structure of an electronic mail application program, and wherein at least one of said electronic mail messages is in more than one category.

10. The method of claim 1, wherein said hierarchical structure of nodes represents a nested set of user groups, and wherein at least one user belongs to more than one of said user groups.

11. The method of claim 1, wherein said unique factorization domain comprises the set of Gaussian integers.

12. The method of claim 1, wherein said at least one non-prime element is not a power of two.

13. A system including at least one processor and a non-signal computer readable medium having program code stored thereon for, when executed by said processor, categorizing information items using a hierarchical structure of nodes, wherein each information item is represented by a leaf node and each category is represented by a non-leaf node in said hierarchical structure, said program code comprising:
   program code for associating a first number with each node, wherein for each non-leaf node said first number is uniquely selected from a subset of relatively prime elements within a unique factorization domain, wherein said subset of relatively prime elements includes at least one non-prime element, wherein elements of said subset of relatively prime elements taken pairwise are all relatively prime to each other, and wherein for each leaf node said first number is equal to one; and
   program code for associating a second number with each node, wherein for each root node said second number is equal to said first number, wherein for each non-root node said second number is equal to a product of said second numbers associated with each direct parent node of said non-root node and said first number of said non-root node, and wherein at least one non-root node has multiple direct parents, said second number for said at least one non-root node being equal to a product determined from multiplying said second numbers belonging to each of said multiple direct parents and said first number of said at least one non-root node.

14. A computer program product, comprising:
a non-transitory computer readable medium having program code stored thereon for categorizing information items using a hierarchical structure of nodes, wherein each information item is represented by a leaf node and each category is represented by a non-leaf node in said hierarchical structure, said program code comprising:
   program code for associating a first number with each node, wherein for each non-leaf node said first number is uniquely selected from a subset of relatively prime elements within a unique factorization domain, wherein said subset of relatively prime elements includes at least one non-prime element, wherein elements of said subset of relatively prime elements taken pairwise are all relatively prime to each other, and wherein for each leaf node said first number is equal to one; and program code for associating a second number with each node, wherein for each root node said second number is equal to said first number, wherein for each non-root node said second number is equal to a product of said second numbers associated with each direct parent node of said non-root node and said first number of said non-root node, and wherein at least one non-root node has multiple direct parents, said second number for said at least one non-root node being equal to a product determined from multiplying said second numbers belonging to each of said multiple direct parents and said first, number of said at least one non-root node.

\* \* \* \* \*